3,429,967
STABLE NEOMYCIN SOLUTION
Patrick Philip De Luca, Morris Plains, and Leon Lachman, Millburn, N.J., assignors to Ciba Corporation, New York, N.Y., a corporation of Delaware
No Drawing. Filed May 17, 1965, Ser. No. 456,534
U.S. Cl. 424—175          14 Claims
Int. Cl. A61k 15/00

ABSTRACT OF THE DISCLOSURE

An injectable solution of a neomycin salt is stabilized by 0.1 to 10% (relative to the neomycin base) each of an ascorbic acid and a soluble metabisulfite.

---

The present invention concerns and has for its object the provision of stable injectable aqueous solutions containing neomycin salts.

The neomycin salts used in the solutions of the present invention are known and may be either derived from the usual complex of neomycin A, B and C or from the single active components. They are used as broad-spectrum antibiotics, active against *M. tuberculosis* and many gram-positive and gram-negative bacteria, either internally, e.g., orally, or parenterally. Aqueous solutions of neomycin salts for the latter purpose, e.g., injectable solutions, however, are susceptible to degradation and color change when stored at room temperature for relatively short periods of time. Highly purified preparations of neomycin are known to be very stable to alkali but unstable to acids.

Surprisingly, we have found that aqueous solutions containing neomycin salts can be stabilized by the addition of (1) an ascorbic acid, and (2) a water soluble metabisulfite, each of which exhibits a synergistic effect on the stabilizing action of the other additive. Accordingly, the injectable solutions of the invention comprise said neomycin salts dissolved in an aqueous pharmaceutical vehicle suitable for injection, which contains an effective amount of the stabilizing agents mentioned under (1) and (2).

An ascorbic acid, is for example, L-xyloascorbic acid (vitamin C) or advantageously D-araboascorbic acid (isoascorbic acid).

A water soluble metabisulfite (or pyrosulfite) is, for example, an alkali or ammonium metabisulfite, such as lithium or potassium, but preferably sodium metabisulfite, or a corresponding salt that is derived from ammonia or an amine, such as a primary, secondary or tertiary lower alkyl-amine, e.g., methylamine, ethylamine, isopropylamine, n-butylamine, diethylamine, di-n-propylamine or triethylamine.

Said stabilizers are added to the solution of the neomycin salts in about equal amounts and with regard to the neomycin base each, in a proportion of about 0.1 to 10%, preferably of about 0.5 to 5%, advantageously of about 1 to 3%. The injectable solutions usually contain the neomycin salts in a range between about 5 and 30%, advantageously about 10 and 20% of the corresponding base, and therefore the ascorbic acid and the metabisulfite each in the most favourable range between 0.1 and 0.6%. If not otherwise stated, the percentage is that by weight.

The injectable solutions according to the invention are generally prepared according to methods used in the art of manufacturing injectable pharmaceutical preparations, essentially by combining the specified proportions of the neomycin salt and the stabilizers with pharmaceutically acceptable aqueous carrier solutions. These are either purified water alone or mixtures of water and water-miscible solvents, such as lower alkanols or aralkanols, e.g., ethanol or benzyl alcohol, lower alkylene glycols or polyglycols, e.g., ethylene glycol or polyethyleneglycol. Other ingredients that may be added to ensure stable solutions for injection are, for example, additional stabilizers, such as thiourea, sodium sulfide, cysteine hydrochloride, sodium formaldehyde sulfoxylate, monothioglycerol or thiosorbitol, any known chelating agents, such as ethylenediamine tetraacetic acid and its mono- or polysalts, citric acid, sodium gluconate and amino acids, solubilizers, such as N,N-di-lower alkyl-alkanoyl-amides, e.g., N,N-diethylacetamide, polyglycols, e.g., polyethyleneglycol, ureas or urethanes, buffers or buffer combinations, such as acetic acid, potassium phthalate and sodium hydroxide, potassium dihydrogenphosphate and disodium hydrogenphosphate or acetic acid and sodium acetate, salts for making isotonic solutions, such as sodium chloride, preserving agents, antimicrobials, e.g., dodecyl-dimethyl-(2-phenoxyethyl)-ammonium bromide and the like. They also may contain other therapeutically valuable substances.

The following working examples are illustrative of the invention, but are in no way intended to limit its scope. Temperatures are given in degrees centigrade.

EXAMPLE 1

Preparation of one liter of an injectable solution containing 14% of the active ingredient.

Ingredients:
   Neomycin sulfate equivalent to 140.0 g. of the base,
   Dodecyl-dimethyl(2-phenoxyethyl)ammonium
      bromide _____g__  0.2
   Isoascorbic acid _____g__  2.5
   Sodium metabisulfite _____g__  3.0
   Sodium acetate _____g__ 14.0
   Water for injection, q.s.
   Acetic acid, q.s.

Procedure.—Dissolve the neomycin sulfate in 800 ml. of water for injection, add the isoascorbic acid, sodium metabisulfite, sodium acetate and the dodecyl-dimethyl(2-phenoxy-ethyl)ammonium bromide, adjust with the acetic acid to pH 6.0, dilute to the given volume, filter through a bacterial filter and fill into 5 ml. ampuls.

EXAMPLE 2

Preparation of one liter of an injectable solution containing 14% of the active ingredient.

Ingredients:
   Neomycin sulfate equivalent to 140.0 g. of the base.
   Benzyl alcohol _____ml__ 10.0
   Isoascorbic acid _____g__  2.5
   Sodium metabisulfite _____g__  3.0
   Sodium acetate _____g__ 14.0
   Water for injection, q.s.
   Acetic acid, q.s.

Procedure.—Dissolve the neomycin sulfate in 800 ml. of water for injection, add the isoascorbic acid, sodium metabisulfite, sodium acetate and benzyl alcohol in that order, adjust with the acetic acid to pH 6.0 and dilute to the given volume. Filter through a bacterial filter and fill into 5 ml. ampuls.

What is claimed is:

1. An injectable solution containing in an aqueous pharmaceutical vehicle suitable for injection about 5–30% of a neomycin salt and, relative to the neomycin base, 0.1 to 10% each of an ascorbic acid and a water soluble metabisulfite.

2. A solution according to claim 1, containing relative to the neomycin base 0.5 to 5% each of the ascorbic acid and the metabisulfite.

3. A solution according to claim 1, containing relative to the neomycin base 1 to 3% each of the ascorbic acid and the metabisulfite.

4. A solution according to claim 1, wherein the neomycin salt is derived from the usual complex of neomycin A, B and C.

5. A solution according to claim 4, wherein neomycin sulfate is used.

6. A solution according to claim 1, wherein the ascorbic acid is D-araboascorbic acid.

7. A solution according to claim 1, wherein the metabisulfite is selected from the group consisting of an alkali metabisulfite and an ammonium metabisulfite.

8. A solution according to claim 7, wherein the alkali metabisulfite is sodium metabisulfite.

9. An injectable solution containing in an aqueous pharmaceutical vehicle suitable for injection about 10–20% neomycin sulfate and 0.1 to 10% of the corresponding base each of D-araboascorbic acid and sodium metabisulfite.

10. A solution according to claim 9, containing relative to the neomycin base 0.5 to 5% each of the ascorbic acid and the metabisulfite.

11. A solution according to claim 9, containing relative to the neomycin base 1 to 3% each of the ascorbic acid and the metabisulfite.

12. An injectable solution containing in an aqueous pharmaceutical vehicle suitable for injection 14% of neomycin base in the form of the sulfate, 0.35% of D-araboascorbic acid and 0.3% of sodium metabisulfite.

13. A solution according to claim 12, wherein the excipient is a 1.4% aqueous solution of sodium acetate adjusted with acetic acid to pH 6.0.

14. A solution according to claim 12, wherein the excipient additionally contains 0.02% of dodecyl-dimethyl (2-phenoxyethyl)ammonium bromide.

References Cited

Dale et al.: Journal of the American Pharmaceutical Association, July 1957, vol. 18, No. 7, Practical Pharmacy Edition, pages 421–425.

ALBERT T. MYERS, *Primary Examiner.*

D. M. STEPHENS, *Assistant Examiner.*

U.S. Cl. X.R.

424—164, 181, 280